United States Patent

[11] 3,633,095

[72] Inventor Robert B. Hood
Los Altos, Calif.
[21] Appl. No. 60,008
[22] Filed July 31, 1970
[45] Patented Jan. 4, 1972
[73] Assignee Fairchild Camera and Instrument Corporation
Mountain View, Calif.

[54] ZERO-CROSSING POWER LINE CONTROL SYSTEM
28 Claims, 15 Drawing Figs.

[52] U.S. Cl. 323/18, 323/19, 323/24, 323/38
[51] Int. Cl. G05f 1/44
[50] Field of Search 307/133, 252 UA; 323/22 SC, 24, 38, 18, 19

[56] References Cited
UNITED STATES PATENTS

| | | | |
|---|---|---|---|
| 3,486,042 | 12/1969 | Watrous | 323/22 SC |
| 3,319,152 | 5/1967 | Pinckaers | 323/22 SC |
| 3,443,204 | 5/1969 | Baker | 323/24 |
| 3,335,360 | 8/1967 | Reinert | 323/22 SC |
| 3,363,143 | 1/1968 | Cavanaugh | 323/22 SC |

*Primary Examiner*—A. D. Pellinen
*Attorneys*—Roger S. Borovoy, Alan MacPherson and Charles L. Botsford

ABSTRACT: A zero-crossing control system operative responsive to zero crossing of power line voltage or current. Each input signal results in the application of one full (360°) cycle of power to the load, the control circuit operating on each input signal to deliver a gate pulse to the power line switch at each of the next two zero line crossings. A hysteresis transfer characteristic is provided in the input circuit of the control system including time proportioning circuits which may be utilized in the control system and output-pulse-forming circuits, circuits providing delay turn-on of the power switch and delay of the input signal, and open and shorted input sensor detector circuits and, operation of the control system with three-phase systems.

INVENTOR
ROBERT B. HOOD

BY Alan H. MacPherson

ATTORNEY

INVENTOR
ROBERT B. HOOD
BY Alan H. MacPherson
ATTORNEY

INVENTOR.
ROBERT B. HOOD

BY Alan H. MacPherson

ATTORNEY

ZERO-CROSSING POWER LINE CONTROL SYSTEM

BACKGROUND OF THE INVENTION

Integrated circuit zero-crossing control systems are presently in use to control the turn-on time of the power thyristors used to connect AC line power to a load, the power switches being operated at a point in time when the line voltage or current is passing through zero. Zero-crossing turn-on greatly reduces the EMI (electro magnetic interference) generation which causes the noise generation in radios, television, and the like. A typical form of IC zero-crossing control circuit is disclosed in U.S. Pat. No. 3,381,226 issued to C. M. Jones, et al., on Apr. 30, 1968.

In general, zero-crossing control systems comprise an input circuit including a sensor, e.g. any commonly used thermister, resistance wire element, photodiode, etc., an I.C. control circuit for operating in response to input signals from the input circuit to produce power switch turn-on signals and for making the decision on whether or not the power switch will be activated, and a power switch coupled to the output of the control circuit and operable thereby to connect the load to the power line.

Control switches that operate in response to the zero crossing of supply line voltage only encounter trouble in operating with inductive load circuits, since the line current in such loads is out of phase with the line voltage. Activation of the power switch at the line voltage zero crossing will result in line switching at a time when current is flowing in the supply line. Special components must be employed external to such line voltage zero-crossing control circuits to permit utilization with loads varying from resistive to inductive.

BRIEF SUMMARY OF THE PRESENT INVENTION

The zero-crossing control circuit of the present invention operates after the first turn-on cycle in response to line current zero crossings and may thus be utilized with loads ranging from resistive to inductive, generally without special components to the integrated circuit. The line voltage and current condition or line signal is sensed at one terminal of the power switching thyristor, and a command signal developed therefrom to activate a pulse generator in the control circuit which delivers the turn-on pulses to the gate of the power thyristor.

Although a constant DC gate drive, wherein a constant DC signal is applied to the gate of the power thyristor to hold it on during the entire interval of the application of load power, could have been employed, a synchronized pulse gate drive is employed in this novel control circuit. This results in a minimum value of power dissipation in the drive circuit, a DC power supply which does not require an electrolytic filter capacitor, a gate pulse that can be transformer coupled into the power thyristor for DC isolation if desired, and freedom from the use of reverse current limiting to prevent excessive dissipation in SCR (silicon-controlled rectifier) type power thyristors.

When the input signal dictates the ON condition, the control circuit operates on the next line current zero crossing to deliver a first turn on pulse to the power switch, and operates again at the next zero crossing to deliver a second turn-on pulse. So long as the on condition in the input circuit persists, these pulse pairs will be generated and delivered to the power switch at successive line current zero crossings.

The input circuit of the present control system is provided with novel circuit means for producing a hysteresis transfer chracteristic, whereby the turn-on and turnoff levels for the input may be variably and independently controlled. Novel circuitry is also disclosed for providing the control circuit with time proportioning to control the on and off intervals of the control circuit in response to the power load requirements.

Special pulse-forming circuitry is disclosed for providing flexibility in the amplitudes and duration of the pulses generated and supplied to the gate of the power thyristor.

Provisions are made for controllably delaying the input signal to the control circuit and also for delaying delivery of the initial pulse to the gate of the power switch. Also, open and short sensor detector circuits are described.

Utilization of the circuit with a DC power supply is illustrated as well as use of the control circuit in a three-phase power line system.

These and other features and advantages of the present invention will become more apparent upon a perusal of the specification taken in connection with the following drawings.

DESCRIPTION OF THE EMBODIMENTS

Figure 1:
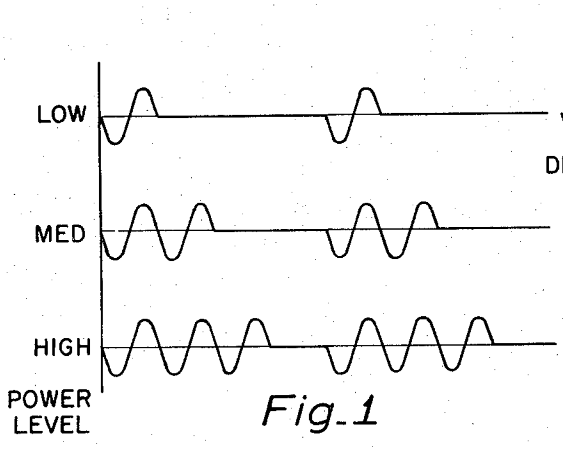
FIG. 1 is a diagram illustrating representative power on and power off conditions for low, medium and high power level situations in the power control system of the present invention.

Referring now to FIG. 1, there is shown a diagram which illustrates the operation of the zero-crossing control system for three different power levels for the load, i.e., low, medium and high. With low power level operation, voltage is applied to the load in an integer number of cycles over a relatively short period of time, followed by long "off" periods extending over an integer number of full cycles. For medium power level operation, an "on" period of an integer number of cycles is followed by an "off" period covering substantially an equal number of full cycles. In the high power situation, the load voltage is applied over proportionately long integer cycle periods with relatively short "off" periods. In all cases, the power is turned on just as the line voltage (or current as explained more fully below) crosses zero, and is maintained for discrete periods of full cycle.

Figure 2:
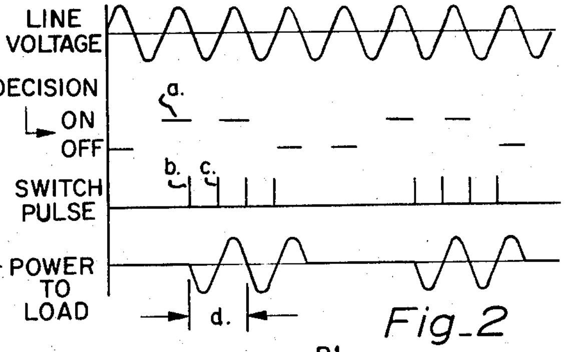
FIG. 2 illustrates the operating logic involved in the control circuit of the present invention.

The operating logic for the zero-crossing system of the present invention is illustrated in FIG. 2. The circuit will make a decision, during the positive half of each cycle of the applied line voltage, whether or not the line voltage shall be applied to the load. For each positive or ON decision, current pulses will be delivered to the gate of the power switch at each of the following two-load current zero crossings to operate the power switch to couple power to the load for the next full-line cycle. Therefore, each ON decision in one positive half-cycle will result in application of the next full (360°) cycle of power to the load. For example, ON decision *a.* results in switch pulses *b.* and *c.* resulting in application of full wave of power *d.* to the load. Each negative or OFF decision will result in no current pulses being delivered to the gate of the power switch and no power to the load over the next full-line cycle.

Figure 3:
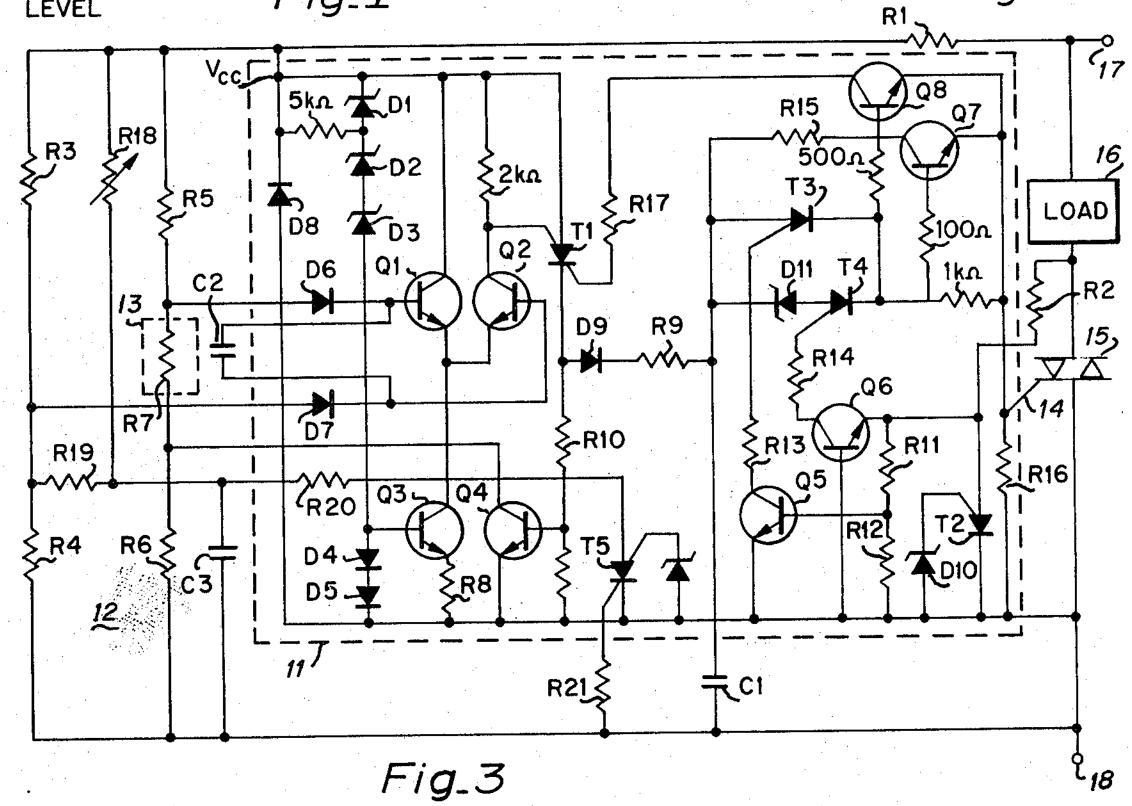
FIG. 3 is a schematic diagram of the control circuit of the present invention including external components suitable for utilization of the control circuit in one embodiment of the invention.

A complete AC power control system incorporating several novel features of the present invention is shown in detail in FIG. 3 and includes an integrated circuit main control circuit 11 serving as the interface between the input circuit 12 including an analog sensor 13, e.g., a thermistor temperature sensor, and the gate terminal 14 of a power-switching thyristor 15 serving to couple the load 16 to the power supply lines 17 and 18.

This novel control circuit may be employed with analog sensors having widely varying characteristics including resistance values from, for example, 4 kΩ to 100 kΩ, and low power dissipation, for example, 10 milliwatts for 10 kΩ sensors; the sensors may be undirectional types such as photodiodes and phototransistors or bidirectional types such as positive or negative temperature coefficient (PTC or NTC) thermistors. The switching thyristors 15 may be, for example, a SCR or triac and the term gate controlled is used herein in a broad sense with reference to the control means for power switches generally.

Resistors R1 and R2 are line voltage dropping elements which, taken in conjunction with internal circuit features of main control circuit 11, serve to limit the terminal voltage of the control circuit 11 to a maximum of 22 volts, a safe value for reliable IC operation. The total current requirement for the system is low enough so that only 2-watt resistors are required for 110 VAC systems.

The power supply part of the control circuit 11 comprises zener diodes D1, D2 and D3 and diodes D4 and D5 which function, during the time intervals in which the AC line is positive (line 17 positive with respect to line 18), to hold the maximum supply voltage at $V_{cc}$ to within 21 volts of the system ground reference (18). During the line supply's negative half-cycle, isolation diode D8 causes the voltage at $V_{cc}$ to collapse to about −0.7 volt, and the front or input portion of the circuit idles. In effect, the circuit operates on a 50 percent duty cycle, and during the ON, or positive half-cycle, period operates as if supplied from a normal DC source.

The external input circuit 12 includes a bridge network comprising three branch resistors R3, R4 and R5, the fourth branch circuit including a fourth resistor R6 in series with the input sensor resistor R7. The junction of R5 and R7 is coupled through a diode D6 to the base of one transistor Q1 of the input differential amplifier, the other side of the bridge being coupled through diode D7 to the base of the other amplifier transistor Q2. The two branches of the differential amplifier are coupled to a current source comprising transistor Q3 and resistor R8. Q3 will begin to conduct and enable the input differential amplifier when the supply voltage $V_{cc}$ exceeds about 14 volts.

If the voltage on the base of Q2, i.e., the reference voltage, is lower than the input voltage from the other branch of the bridge on the base of Q1, then Q1 will conduct and Q2 will be nonconducting. This is the inhibit state for the control circuit 11 and the load 16 will remain unenergized. When the input on the base of Q1 goes lower than that on Q2, responsive to a resistance change in sensor resistor R7, the current path is switched from the Q1 branch to the Q2 branch, and gate current is extracted from thyristor T1 which turns ON, applying approximately 20 volts to resistors R9 and R10. This may be referred to as the trigger state, and current flows through diode D9 and resistor R9 to the storage capacitor C1, which charges up to about 19.5 volts to be utilized later at the two subsequent line current zero-crossing points as described below.

Current flow through R10 turns on the clamp transistor Q4 so that the voltage drop across the external resistor R6 is reduced to a singe $V_{CE(SAT)}$. This has the effect of driving the base of Q1 further negative and widening the difference between the input on the base of Q1 and the reference on the base of Q2, which, in turn, furnishes added gate drive for the switch T1. The operation of the clamp Q4, by in effect switching R6 in and out of the bridge circuit, also defines the change in input voltage level required to make the circuit return from the ON or trigger state to the OFF or inhibit state, described in more detail below with reference to the hysteresis characteristic of this control circuit.

The zero-crossing sensing circuit for sensing the line signal comprises transistors Q5 and Q6, thyristor T2 and their associated components, this circuit operating to insure that the trigger output pulses delivered to the switch 15 by the pulse generator, which comprises transistor Q7, thyristors T3 and T4, and their associated components, are delivered at the zero crossing of the load current in order to minimize the generated EMI.

Early during each positive half-cycle of the line current, before the anode voltage of the power triac 15 has reached about 7 volts, transistor Q5 is forward biased via resistors R2, R11 and R12. When the anode voltage of triac 15 exceeds the zener voltage of the zener diode D10 (about 7 volts), T2 switches ON and causes the sync input voltage at the junction of R2 and R11 to collapse to about 1 volt, thus turning Q5 off. Note that this occurs at about the 7-volt period in the rising positive line voltage, whereas the switch T1, if turned ON during the positive half-cycle, is turned ON later in the cycle, at about the 14-volt period or later. Thus, although Q5 is turned ON and causes current to flow out of the anode gate of thyristor T3 through R13 during the early part of the positive half-cycle of the line current, before Q5 is turned OFF, T3 will not be switched ON if there is an absence of a stored voltage on capacitor C1. If, on the other hand, T1 is turned ON, capacitor C1 will change to approximately 20 volts.

At the start of the following negative half-cycle, Q6 begins to conduct and draws current through R14 out of the anode gate of T4, T4 turning ON to turn on Q7 and discharge the storage capacitor C1 via the resistors R15 and R16, delivering a sharp, approximately 1-ampere driving pulse to the gate 14 of the triac switch 15 which turns on and supplies power to the load 16. The rise time of the pulse to its 1-amp peak is about 150 nsec., the rate of decay being such that the pulse amplitude falls to about 100 ma. after 6 sec., a pulse with nearly ideal characteristics for most power switching thyristors. Thyristor T4 also supplies base drive to transistor Q8, which functions along with R17 as described below during utilization with a DC supply.

When the voltage across C1 is discharged to about 8 volts, a voltage too low to sustain current through T4 because of zener diode D11, T4 turns OFF and turns Q7 OFF to terminate the pulse to the gate of triac 15. The voltage of 8 volts is then retained on C1 until the beginning of the following positive half-cycle.

During negative half-cycles of the line voltage (line 17 negative with respect to 18) T1 turns OFF to await the ON-OFF decision of the input circuit during the next positive half-cycle.

At the start of the next positive half-cycle, Q5 is again forward biased via resistor R2, R11 and R12 and turns on, drawing current from the gate of T3 which turns ON and turns ON Q7, which delivers the energy from C1 to the gate 14 of switch 15 in a second short approximately 1-ampere pulse. When the voltage of C1 has been reduced to about 1 volt, T3 falls out of latch, turning Q7 OFF and terminating the pulse to the gate of switch 15.

At the start of the next position half-cycle, Q5 is again forward biased to turn ON and draw gate current from T3, but this is not significant since C1 does not get recharged until later in the positive cycle, if at all. Should the input circuit 12 dictate that the switch 15 is to remain operative to apply power to the load 16, Q2 will conduct to turn switch T1 on and recharge C1 during the first half of the positive half-cycle, and the above-described operations will be repeated to provide the two more gate pulses to switch 15 at the next two zero-crossing points.

From the above description it can be seen that the energy from C1 is parcelled out in two discrete energy pulses, the first at the zero crossing from positive to negative and the second at the following zero crossing from negative to positive. The energy pulses are accurately controlled as to strength so that the external power thyristor 15 receives an adequate gate signal at each crossing.

Figure 4:
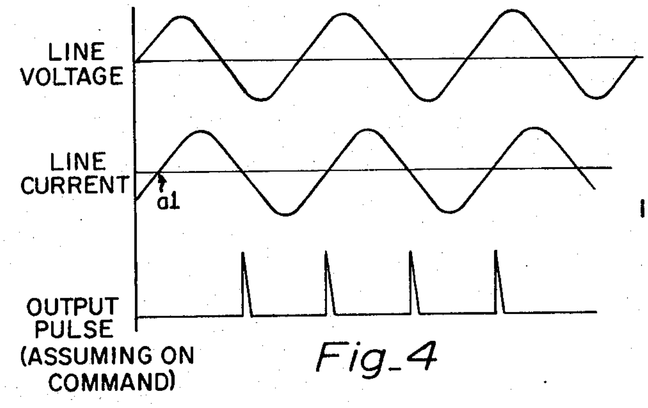
FIG. 4 shows the line voltage and current for an inductive load, and the turn-on pulses at the line current zero-crossing points.

It is important that the signal derived via R2 from one terminal of the triac 15 is used to signal the time of zero crossing, and this significance may be more readily understood by referring to the schematic waveform diagram of FIG. 4 illustrating the line/load waveforms for a typical AC inductive load-switching condition. It is noted that the line current is 90° out of phase with the line voltage. When the load current passes through zero from negative to positive at point *al.*, the triac 15 loses holding current and momentarily presents a high resistance to the series divider formed by the load 16 and the triac 15. Since the load has a relatively low impedance, the remote triac terminal attempts to increase to the line voltage and produces a positive signal via resistor R2 to the zero-crossing sensing circuitry.

The benefit of using a technique responsive to load current zero crossing is obvious if it is assumed that the phase lag of the load current varies, a situation frequently encountered in the case of motor loads where, as the motor start winding is switched out, the phase lag of the motor can change by as much as 50°. If the position of the load current's zero crossing moves either forward or back in time, it is obvious that the synchronizing signal will also shift (the triac waits to fall out of latch until its current passes through zero). This will cause the required change in the timing of the triac gate pulse to hold RFI generation to a minimum.

Actually, since all loads appear the same before they are turned ON, the first turn ON occurs when the line *voltage* crosses zero, and each subsequent turn ON follows the line *current* zero crossings.

This zero-crossing control circuit may be operated from a DC supply, e.g., 24 volts. by eliminating the R1 connection in FIG. 3 and coupling the DC supply to the $V_{cc}$ point. In the DC mode of operation, the differential amplifier Q1, Q2 is always in operation. Therefore, regardless of the instantaneous polarity of the AC line, the storage capacitor C1 starts charging as soon as T2 is triggered ON by Q2.

If Q2 is turned ON during a positive half-cycle, at the beginning of the next negative half-cycle Q2 will be forward-biased and T4 will turn ON, forward-biasing Q7 and Q8. Q7 produces the output trigger pulse at the beginning of this half-cycle while Q8 pulls current out of the cathode gate of T1 causing it to turn OFF. T1 will turn ON again as soon as Q8 turns OFF, recharging C1 back up to about 19 volts. At the next positive half-cycle, Q5 is forward-biased and the second output pulse is delivered to triac 15; Q8 again pulls current out of T1 and it turns OFF. This time C1 discharges to about 1 volt. When T1 turns ON again, C1 charges back up to 19 volts and the cycle continues.

If Q2 is turned ON during a negative half-cycle, at the start of the next positive half-cycle Q5 will be forward-biased and T3 will turn ON first, forward-biasing Q7 and Q8. The triac 15 will, therefore, conduct initially at the start of the positive half-cycle or at the start of the negative half-cycle.

Figure 5:
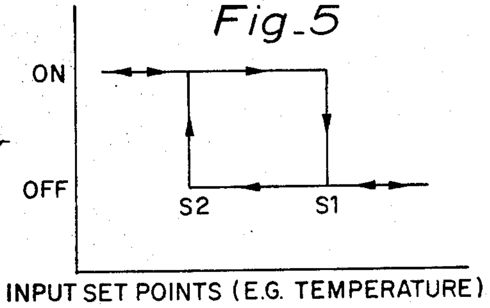
FIG. 5 is an illustration of the transfer characteristics of the hysteresis control operation of one embodiment of this invention.

The control circuit's transfer characteristics can be explained by referring to FIG. 5 which shows the two possible input states, i.e., ON or trigger and OFF or inhibit, and the two switching points S1 and S2 for turning the system from ON to OFF and from OFF to ON, respectively. The signals needed for the ON-OFF decision are supplied by the input bridge network including resistor R7 which we will assume is in a remote sensing location consisting of a PTC thermistor temperature sensor in series with a temperature adjust potentiometer. This branch of the input bridge would typically serve a wall thermostat-type function, the control circuit switching a heater load to vary the temperature in the room. Although the sensor resistor R7 is shown in one particular arm of the bridge, it could be positioned in other bridge locations such as that occupied by R3, R4 or R6. If a negative temperature coefficient thermistor had been chosen, arms R4 and R5 would be logical choices as possible sensor positions.

With the PTC thermistor resistance value R7 low (relative to the values of R3, R4 and R5) at a low ambient temperature, the power switch 15 is held in the ON condition causing the temperature in the room to eventually increase the resistance of R7, in turn increasing until the R6+R7 branch of the input bridge rises above 10 kΩ, assuming the value of the bridge arms at 10 kΩ. At this point (S1 in FIG. 5) the control circuit operates to remove gate drive from switch 15, and the heater load 16 is turned OFF. As described above, when T1 is ON clamp transistor Q4 is ON and serves to shunt R6. Therefore, R7 must rise to a higher resistance than that value if R6 had not been shunted, in order to raise this branch resistance to the 10 kΩ value needed to turn Q1 ON and Q2 OFF.

After some thermal overshoot subsequent to when the heater load is first turned OFF, the temperature decreases to cause the resistance of R7 to lower. At this time, there is no shunt across R6 and its resistance is added in series with R5, so that the resistance of R5 must decrease below its value needed to produce the transfer at S1. Thus the temperature reduces to S2 before the resistance of R7 is low enough to total, with R6, the 10 kΩ value to produce a negative voltage on the base of Q1 relative to the voltage on the base of Q2, to turn Q2 ON to trigger the control and switch to the ON state at S2 in the manner previously explained. The temperature overshoots in the decreasing direction and then starts to increase until the point S1 is reached and the cycle repeats.

The two operating points S1 and S2 are controlled by the values of R6 and R7; the turn ON point S2 is set by the sum of R6 and R7, the turn OFF point S2 is set by the value of R7, and the distance between S1 and S2 (the control hysteresis) is set approximately by the value of R6.

This hysteresis transfer characteristic explains the purpose of diodes D6 and D7 and the capacitor C2. For input signals between the two transfer points S1 and S2, the system may have either of the two possible states, ON or OFF. If an input signal between S1 and S2 is applied for the first time, the system will assume the OFF STATE. However, if later changes in the input signal cause the system to turn ON, then the system should retain the ON condition for signals between S1 and S2 until the lower threshold point, S2, is reached. To accomplish this, the circuit must have a memory. In conventional two level circuits such as a Schmitt trigger, a transistor latched ON maintains a record of the system's previous state. In this circuit, because $V_{cc}$ is periodic, a different memory is used. Memory of the control circuit's condition is kept during the negative half-cycle inhibit periods when the circuit is idling by energy storage in capacitor C2. This stored energy forces the differential amplifier Q1 and Q2 to tend to assume that the previously held state at the beginning of each positive half-cycle. Diodes D6 and D7 prevent C2 from discharging into the input bridge network during the negative half-cycle idle period. The charge on C2 is refreshed during each positive half-cycle. In addition to serving as a memory, C2 also shows the amplifier frequency response to help eliminate false system noise turn ON.

It is seen from the above, particularly by observing the variation from variation from one end of the hysteresis loop to the other, that the room temperature must oscillate if power is applied in slowly cycling blocks of either full power or no power at all. In many cases, tightened control of the hysteresis (S1–S2) will provide sufficiently accurate temperature control.

However, where such temperature excursions are not desired, time proportioning control may be utilized, a feature which provides changes in the proportion of the heater load "ON" time versus "OFF" time with room temperature variations so as to maintain the room temperature substantially uniform with heat being supplied just sufficient enough to make up for the heat lost from the room.

Figure 6:
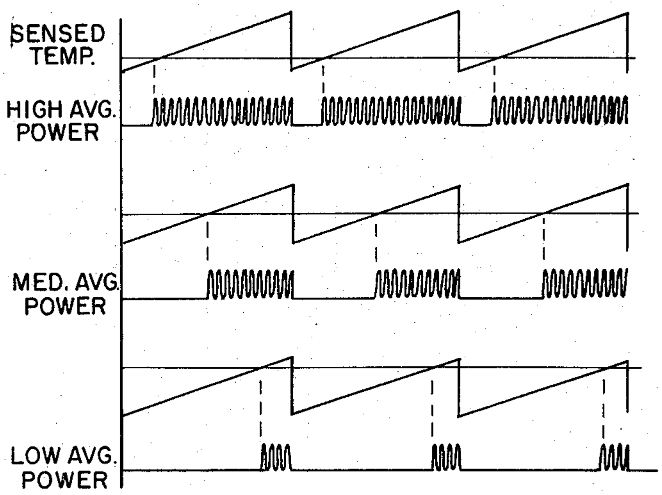
FIG. 6 is an illustration of the operation of the time proportioning feature of the invention.

This operation is shown in schematic form in FIG. 6 where three situations are shown including one stage where the room temperature is lower than the "control set" temperature and the average load power must be high, a second stage where the room temperature is at the "control set" value and only average heat power is needed to maintain the temperature, and the third stage where the heat is higher than the set value and low heat power is needed.

The input or sensed room temperature is represented by a straight line; the variation in temperature is very slow and the slope of this line is not apparent. The proportioning reference signal is represented by the sawtooth waveform and the control circuit is arranged so that the load power is turned ON Whenever the sawtooth reference is higher than the sensed room temperature.

The sawtooth waveform is generated by the relaxation oscillator form by R19, C3, and 6.6-volt fixed-threshold thyristor T5 in the control circuit 11. Charging current through R18 during each positive excursion of the line voltage charges C3 over a plurality of line voltage cycles until its voltage reaches the threshold voltage of T5, at which time T5 turns ON and discharges C3 to about 1 volt. Resistor R20 serves to limit the peak capacitor discharge current to safe values. The thyristor T5 then loses latching current during the next negative half-cycle, and C3 charges up during the next plurality of positive cycles and this cyclic chargeup and discharge of C3 is repeated. This cycle sawtooth wave is applied through R18 to the input to the base of Q2, to change the reference voltage on the base on Q2 relative to the input voltage on the base of Q1 in sawtooth fashion. A resistor R21 placed between the gate of T5 and system ground controls the switching sensitivity of the proportioning switch.

Although the circuit of FIG. 3 produces an output pulse powerful enough to activate most currently manufactured triac and SCR power switches, there may be instances in which very insensitive power switches or loads with extremely slow rise times will require longer and larger gate current pulses. The circuit of FIG. 7, when utilized with the control circuit 11 of FIG. 3, will produce a longer output pulse with twice the peak amplitude. A 20-volt half-wave shunt regulated DC supply is formed by D12, R22, zener D13 and C4. Transistor Q10 turns ON, delivering drive current from C4 through R23 to the gate of triac 15, which turns ON. In a normal operating sequence, the output gate pulse from control 11 is fed into the base of Q9 which turns ON, forward-biasing diodes D14. This places a fixed voltage between the + terminal of C5 and the base of Q10, thus placing a relatively constant 1.8 volts between the higher voltage side of R23 and the base of Q10. With a 0.6-volt $V_{BE}$ for Q10, the remaining 1.2 volts is maintained across R23, and the emitter current will automatically be held at the value 1.2/R23. Since for reasonably high gain transistors $I_e \cong I_c$, the combination D14, R23, and Q10 form a constant current source which is switched ON whenever Q9 is turned ON by the control circuit's (11) output pulse. The ON period can be controlled by varying the size of the storage capacitor C5.

Figure 7:
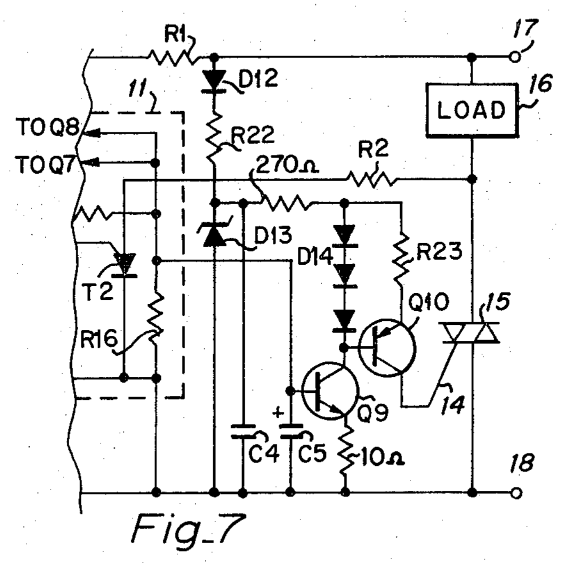
FIG. 7 is a schematic diagram of an output pulse forming and amplifying circuit which may be employed with the control system of this invention.
Figure 8:
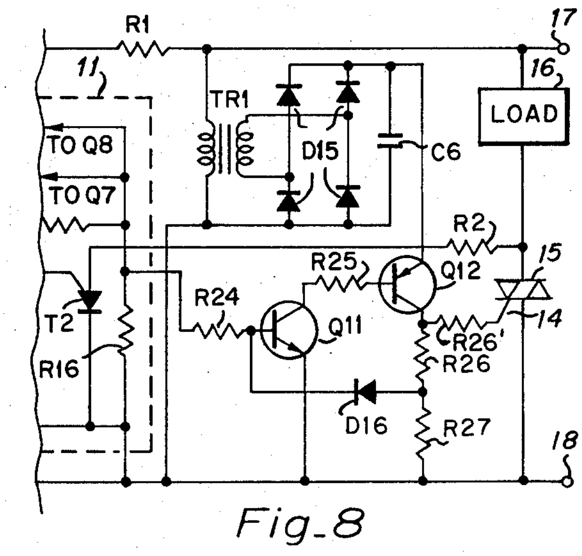
FIG. 8 is a schematic diagram of a second form of output pulse forming circuit which may be employed.

The control circuit output circuit of FIG. 8 will provide a longer time duration output pulse than that of FIG. 7, although not providing the constant current feature. The pulse produced has a 2-ampere peak with a relatively linear decay to —1 ampere within 500 $\mu$sec.

Power for this circuit is supplied by the stepdown transformed TR1 (a common 6.3 volt filament transformer), the full-wave rectifier bridge and filter is formed by the diodes D15, and capacitor C6. When an output pulse is received from the control circuit 11 via resistor R24, transistor Q11 is turned ON. The collector current of Q11 provides base drive through R25 to transistor Q12 which serves as the output switch, transferring energy from C6 into the gate of the power thyristor 15. During the output pulse, the increased voltage at Q12's collector provides added base drive for Q11 via the R26–R27 divider and diode D16. Q11 and Q12 latch on until C6 has been partially discharged. When the current supplied by C6 has fallen to a value below that needed to hold Q11 and Q12 in latch (about 1 ampere), the two transistors turn OFF and terminate the pulse to the gate of thyristor 15. C6 will then recharge to await the next output pulse from circuit 11. The energy of each pulse to triac 15 is set by the voltage change of C6 during the pulse and the value of C6. The rate of discharge of C6 is set mainly by the input characteristics of the triac 15 and the value of R26. The control circuit 11 only serves to initiate the output pulse, and does not set the ON-OFF time of Q11 and Q12. Therefore, this circuit is useful when one desires to lower the control circuit's C1, a good feature when driving insensitive gate load switching thyristors in 400 Hz. or higher frequency systems.

Figure 9:
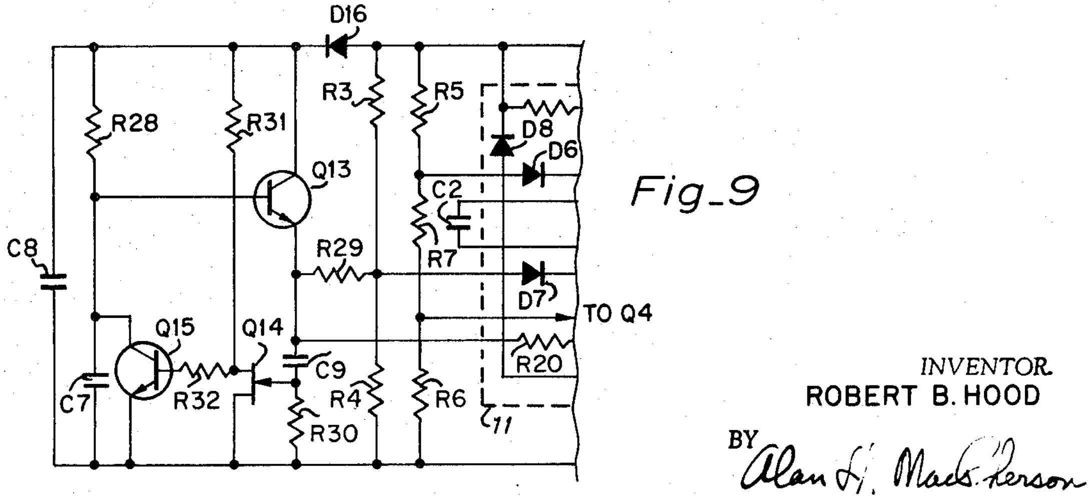
FIG. 9 is a schematic diagram of a circuit employed to extend the time-proportioning period of the novel control circuit.

At times it is desirable to extend the period for the time proportioning beyond that of the system described above. The circuit shown in FIG. 9 provides a proportioning time base input for the control circuit 11 with a period of up to 1½ minutes. The time base for the sawtooth waveform is generated by the RC charge circuit formed by R28 and C7. Charge from the control circuit's $V_{cc}$ supply is supplied via forward biased D16. Diode D16 and capacitor C8 serve to maintain the $V_{cc}$ supply for this part of the circuit during the negative half of the line voltage.

In operation, current through R28 charges C7 up at a rate set by R28, C7. This rising voltage is coupled to the base of emitter follower transistor Q13, which holds the positive terminal of C9 to within 0.6 volts of C7's positive terminal. The timed rise of C7 is then reflected as an equal increase in C9's voltage, which is coupled by R29 to the input of Q2 in the input differential amplifier.

When C9's voltage has reached the breakdown value of the control circuit's internal threshold thyristor T5, it is rapidly discharged to the system ground, via the current path including R30.

The charge-discharge fluctuation in the voltage of C9 generates a sawtooth waveform which functions in exactly the same manner as the shorter sawtooth period described for FIG. 3, this sawtooth input being coupled to the base of Q2 in the differential amplifier.

During the charging interval, current through R31 is shunted to ground by the drain-source path of junction field-effect transistor Q14. For this operation, Q14 may be regarded as simply a resistor of about 125Ω when zero or a positive voltage is applied to its gate. However, when a negative gate voltage of sufficient magnitude is applied, its drain-source terminals become essentially open circuited.

During the C9 discharge interval, C9's discharge current through R30 produces a negative gate voltage for Q14, causing a sharp rise in the drain-source resistance. The current through R31 is then routed via R32 into the base of Q15. With Q15 turned ON, C7 is reset to zero via Q15's collector-emitter terminals.

A number of common AC loads 16 have magnetic structures which are capable of being saturated during the first cycle after turn ON, resulting in a very sharp rise in load current just after the application of power, which can cause failure of the power switching thyristor 15. For example, turn ON of a standard 10 ampere bench autotransformer can result in surge transients of the order of 43 amperes.

Figure 10:
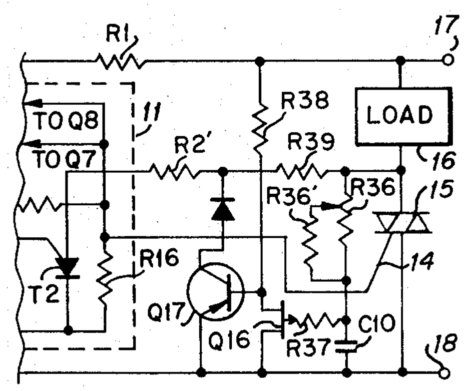
FIG. 10 is a schematic diagram of a circuit utilized to provide a delay in the initial turn-on signal for the control circuit.

The circuit of FIG. 10 is provided to delay the start of the first cycle turn ON of the control circuit of FIG. 3 by about 4 milliseconds which has the beneficial effect in the case of the autotransformer mentioned above, of reducing the surge to about 0.3 ampere.

In operation, and assuming that initially there are no gate pulses being received from control circuit 11, approximately full line voltage will be developed across the main conduction terminals of the power thyristor 15. Resistors R36, R36′ and capacitor C10 then form a phase shift network which generates a 90° phase shifted voltage across C10. This voltage is applied via R37 to the gate of the P channel junction field-effect transistor Q16. During the periods that the $R_{DS}$ value of Q16 is high, the bias network formed by the drain-source path of Q16 and the resistor R38 drives the base of transistor Q17, which turns ON to deliver a sync signal via resistor R2' to the control circuit. This sync signal is delayed by approximately 90° from the line voltage zero crossing. This condition continues until the control circuit 11 functions to apply gate drive to triac 15 to turn ON triac 15 after said 90° delay.

After the first turn ON event, the drive to R36, R36' is interrupted by the triac's low saturation voltage (about 2 volts). There is now insufficient energy for the R36, R36', C10 phase shift circuit to apply turnoff voltage to the gate of Q16, and Q16 stays ON permanently, holding Q17 OFF. With Q17 OFF, R2' and R39 act as the normal synchronizing drive resistor (R2 in FIG. 3).

In this circuit, the divider formed by R2' and R39 limits the $V_{CE}$ applied to Q17. R2' also acts as a divider together with the control circuit's internal resistors to prevent false application of the synchronizing signal. For optimum performance, the circuit's first cycle phase delay should be matched to the load and the potentiometer arrangement R36, R36' is provided for this purpose.

Figure 11:
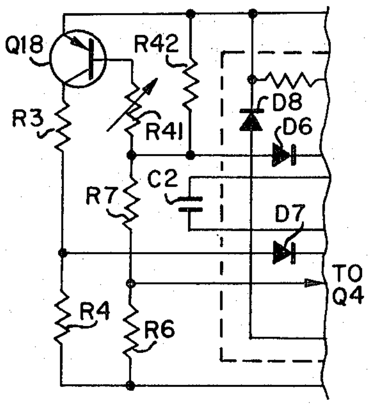
FIGS. 11 and 12 are schematic diagrams of open and short sensor detector circuits, respectively, which may be employed with the control circuit.

In many control systems, one type of failure (short or open circuit) of the input sensor can cause a dangerous condition. For instance, a heating control with an NTC sensor would interpret shorted thermistor leads as a very high sensed temperature and would interrupt the application of power to the load. This could be regarded as a "fail-safe" condition since furnace over temperature (and the resultant fire or explosion hazard) is avoided. However, if the same NTC sensor fails in the "open" condition (due to lead wire breaks, etc.) the control system would react by continuously applying power to the load. In this case, an open sensor detector of the type shown in FIG. 11 is desired to protect the system against this condition. Alternately, other types of control systems (for instance, a heater control system with PTC thermistors) may interpret a "shorted" sensor in a dangerous manner. For this instance, a "shorted" sensor detector system is shown in FIG. 12.

Referring now to FIG. 11, during normal operation, Q18 is held in the ON condition by the current through R41. This provides base drive to apply $V_{cc}$ (minus Q18's $V_{CE(SAT)}$ to R3. Resistor R42 (about 100 kΩ) is too high to seriously affect the circuit's operation. If R41, which includes the sensor, should open, then base drive for Q18 is interrupted and Q18 turns OFF causing the voltage to the base of Q2 to fall. At the same time, R42 applies a positive voltage to the base of Q1 and thus the input amplifier is placed in the inhibit state and no gate drive will be delivered to power switch 15, a "fail-safe" condition.

Figure 12:
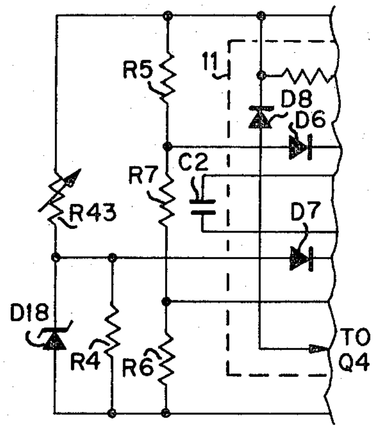

In the shorted sensor circuit of FIG. 12, when the sensor arm (resistor R43) is shorted, zener diode D18 limits the $V_{cc}$ of the control circuit 11 by shunting the IC's internal zener diodes D1, D2, and D3. The input amplifier is prevented from turn ON by lack of base drive for constant current source transistor Q3. The output of 11 is then prevented from turning ON the triac 15 because gate drive is not available for thyristor T1 in control circuit 11. This provides a second "fail-safe" condition. Note that zener diode D18 may be replaced by the interval fixed voltage thyristor T5 in control systems not using the proportioning feature. (This technique requires readjustment of the input bridge resistors so that the common mode input voltage does not exceed 6.8 volts during normal operation).

Figure 13:
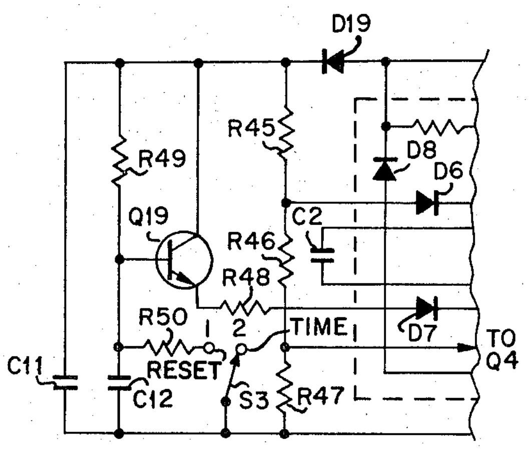
FIG. 13 is a schematic diagram of a time delay circuit for the input network of the control circuit.

There are a number of possible ways in which the control circuit's flexible input bridge may be used to generate a time delay function. One common utilization is the time delay relay illustrated in FIG. 13. With the switch S3 in the "reset" position 1, resistor R50 holds the capacitor C12 to within 1 volt of ground. This will hold Q19 in the OFF condition, effectively lowering the potential on the base of Q2 to near ground. At this time the voltage divider formed by R45, R46, and R47 holds the base of Q4 near 10 volts and the control circuit 11 is held in the OFF condition.

When the switch S3 is moved to the "time" position 2, capacitor 12 is charged by current through resistor R49. The emitter voltage of Q19 will correspondingly increase along with the C11 voltage until transistor Q2 turns ON. The gate C12 voltage will continue to rise until it stabilizes at some higher value. By selection of different values for R49 and C12, time delays up to 105 seconds may be provided.

When S3 is returned to the reset position 1, C12 is discharged through R50. The value of R50 is small to provide rapid reset of C12. If a time delay reset is desired, R50 may be increased; C12 will be discharged at the rate determined by the R50, C12 product. Diode D19 and capacitor C11 provide the timer circuit with a half-wave rectified DC supply.

Figure 14:
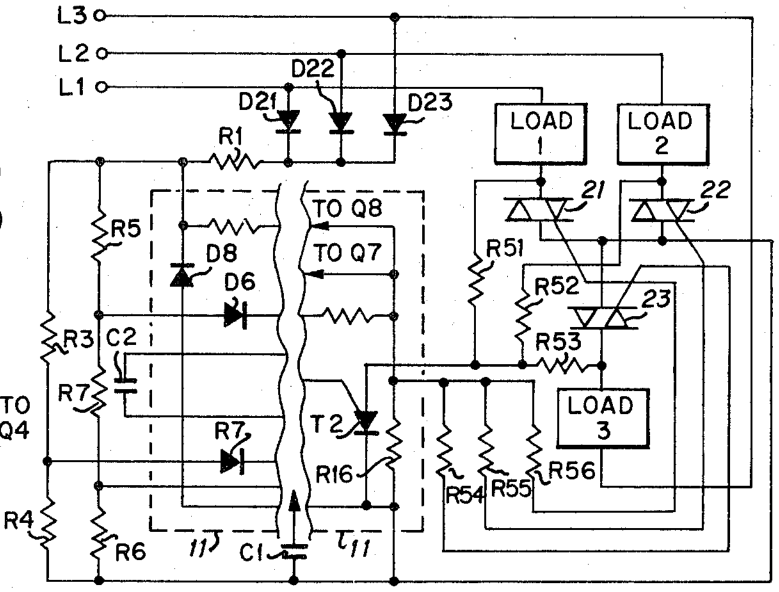
FIG. 14 is a schematic diagram of the control circuit utilized in a three-phase Y-connected power line system.

The control circuit of this invention may be utilized in three-phase circuits, and one such embodiment is shown in FIG. 14 where the control circuit 11 of FIG. 3 gives control of a three-phase Y-connected load from the center of the Y. The three power switching thyristors 21, 22 and 23 are placed adjacent to the center (neutral) which is used as a common circuit ground-analogous to L2 in the single-phase circuits. Diodes D21, D22, and D23 serve as three-phase rectifiers driving R1 for the control circuit power supply.

The synchronizing signals are derived from the triac remote terminals via resistors R51, R52 and R53. The output gate drive current sharing resistors are R54, R55 and R56.

Figure 15:
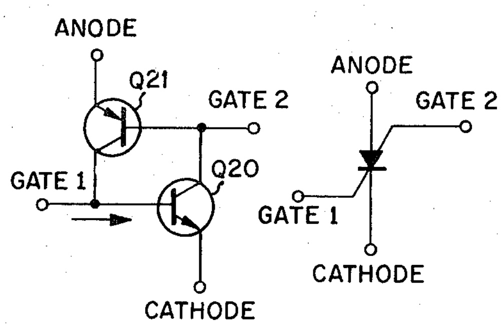
FIG. 15 is a schematic diagram of the transistor circuit utilized as the thyristors in this IC circuit.

In the integrated circuit control circuit of the present invention, each of the thyristors T1 to T5, inclusive, were actually formed by a two-transistor circuit of the type shown in FIG. 15, which has an ON or conducting state and an OFF or blocking state. Assume that there is no connection to gate 2, that the anode terminal of the transistor pair is blocking a positive voltage, and that a current in the direction of the arrow is slowly applied to the gate 1 terminal. As this gate current is increased from zero, transistor Q20 will be gradually turned ON. However, since there is no connection to gate 2, Q20's collection current also serves as the base current for Q21.

This results in a slow turn on of Q21 and now the base drive for Q20 has two sources, the original gate drive and Q21's collector current. The additional increment of Q20 base current due to Q21 collector current causes Q20 to turn even further ON, and results in a stronger base drive for Q21. A rapid escalation of the two base-collector current drives both transistors into virtual saturation, and the voltage at the anode collapses.

If the gate drive to the circuit is removed after turn ON, the circuit will continue to conduct. However, if anode current is subsequently lowered to a value below that required to hold both transistors in latch, then the unit will return to its OFF or open circuit condition.

By way of example, the components in the drawings have the following values, with resistors in ohms and capacitors in microfarads:
R1, R2, R3, R4, R5, R7, R10, R32, R41, R43, R51, R52, and 53—10 k; R6 and R50—100; R8, R14, R17, and R47—1 k; R9 and R22—2 k; R11—6 k; R12 and R13—3 k; R15—10; R16—300; R18, R21, R42 and R46—R46—100 k; R19—200 k; R20—500; R23—0.5; R24—27; R25—20; R26 and R30—270; R26'—1; R27—120; R28—3.9 M; R29 and R38—330 k; R31, R45 and R48—47 k; R36—250 k; R36'—33 k; R37 and R49—4.7 M; R39—8.2 k; R54 and R56—24Ω; C1 and C8—0.47; C2—0.33; C3—5; C4—20; C5, C7 and C12—25; C6—100; C9—1; C10—0.025; and C11—10.

What is claimed is:

1. A control circuit for operating a gate-controlled power switch serving to connect a load circuit with an AC power supply line, said control circuit being operable in response to an input signal, said control circuit comprising first circuit means including a pulse generator responsive to said input signal for delivering pulses of energy to the gate of said power switch to activate said switch and couple the load circuit to the power supply line, and second circuit means coupled to said power switch and responsive to the line current signal at said power switch crossing zero for operating said pulse generator means to deliver said pulses of energy to said power switch at said zero crossing, said pulse generator comprising a capacitor having electrical energy stored therein in response to said input signal and switch means operable by said second circuit means for delivering successive portions of said stored energy to said gate at successive zero-crossing points, said switch means comprising a pair of switch circuits coupled to said energy storage means and to said second circuit means, said switch circuits being operated in sequence by said second circuit means to deliver said successive energy portions to said gate.

2. A control circuit as claimed in claim 1 wherein said second circuit means comprises a resistor coupled to one terminal of said power switch and a pair of transistor circuits, one transistor circuit being operative at the start of one half-cycle of the line current at said power switch to activate one of said switch means in said pulse generator and the other transistor circuit being operative at the start of the other half-cycle of the line current to activate the second of said switch means in said pulse generator.

3. A control circuit as claimed in claim 1 including means coupled to a first one of said pair of switch circuits for limiting the energy delivered by said one switch circuit from said energy storage means to said power switch gate.

4. A control circuit as claimed in claim 1 wherein said pair of switch circuits include a common transistor circuit coupled to said energy storage means, each of said switch circuits, when activated, operating said common transistor circuit to deliver the energy from said energy storage means to said gate.

5. A control circuit as claimed in claim 1 wherein said first circuit means comprises an amplifier circuit responsive to said input signal and a switch circuit coupled to said amplifier and operated therefrom to couple said energy storage means to an energy source.

6. A control circuit as claimed in claim 5 wherein said energy storage means comprises a capacitor.

7. A control circuit as claimed in claim 5 wherein said amplifier means comprises a differential amplifier circuit including two branch circuits and a common current source.

8. A control circuit as claimed in claim 7 wherein said switch circuit is coupled to one of said branch circuits and is responsive to the current flow through said branch circuit.

8. A control circuit as claimed in claim 5 including circuit means coupled to said power line and to said amplifier circuit and operative during one of two half-cycles in each full cycle of power on said power line to energize said amplifier circuit.

10. A control circuit as claimed in claim 9 including a memory circuit coupled to said amplifier for maintaining a record of the condition of said amplifier from one positive line cycle to the next.

11. A control circuit as claimed in claim 5 and having an input hysteresis transfer characteristic, wherein said amplifier circuit is activated responsive to a particular voltage level of input including an input circuit for producing said voltage level input to said amplifier and responsive to a variable level external control signal, and means in said input circuit responsive to the activation of said amplifier circuit for varying the level at which said input circuit is responsive to said external control signal to produce said voltage level input to said amplifier.

12. A control circuit as claimed in claim 11 wherein said input circuit comprises a bridge circuit for receiving said external control signal, and wherein said means responsive to said amplifier activation comprises a circuit component in one arm of said bridge coupled to said amplifier.

13. A control circuit as claimed in claim 11 including circuit means coupled to said power line and to said amplifier circuit and operative during the positive half-cycles of power on said power line to energize said amplifier circuit.

14. A control circuit as claimed in claim 13 including a memory circuit coupled to said amplifier for maintaining a record of the condition of said amplifier from one positive line cycle to the next.

15. A control circuit as claimed in claim 1 comprising a second pulse generator including a second energy storage means therein, and circuit means for coupling said second pulse generator between said first pulse generator and said gate, said second pulse generator operating in response to the portions of energy delivered thereto from said first pulse generator for generating energy pulses from the energy storage means in said second pulse generator for delivery to said gate.

16. Claim 15 wherein said second energy storage means comprises a capacitor.

17. A control circuit as claimed in claim 1 wherein said second circuit means comprises a delay circuit for delaying the response to a first line current zero crossing, and means for disabling said delay circuit from operating during subsequent line signal zero crossings.

18. A control circuit as claimed in claim 1 wherein said second circuit means comprises a resistor coupled to one terminal of said power switch and a pair of transistor circuits, one transistor circuit being operative at the start of one half-cycle of the line signal to activate said pulse generator to deliver one pulse to said power switch and the other transistor circuit being operative at the start of the next half-cycle of the line signal to activate said pulse generator to deliver a second pulse to said power switch.

19. A control circuit as claimed in claim 18 wherein said pulse generator comprises energy storage means having electrical energy stored therein in response to said input signal, said pulse generator being operable by said second circuit means for delivering successive portions of said stored energy as said first and second pulses to said power switch at successive zero crossing points.

20. A control circuit as claimed in claim 19 wherein said energy storage means comprises a capacitor.

21. A control circuit as claimed in claim 19 wherein said pulse generator comprises a pair of switch circuits coupled to said energy storage means and to said second circuit means, said switch circuits being operated in sequence by said second means to deliver said successive energy portions to said power switch.

22. A control circuit as claimed in claim 19 wherein said first circuit means comprises an amplifier circuit responsive to said input signal and a switch circuit coupled to said amplifier and operated therefrom to couple said energy storage means to an energy source.

23. A control circuit as claimed in claim 22 wherein said amplifier means comprises a differential amplifier circuit including two branch circuits and a common current source.

24. A control circuit as claimed in claim 23 wherein said switch circuit is coupled to one of said branch circuits and is responsive to the current flow through said one branch circuit.

25. A control circuit as claimed in claim 1 wherein said first circuit means comprises an amplifier circuit responsive to said input signal for delivering energy to said pulse generator and circuit means coupled to said power line and to said amplifier circuit and operative during one of the two half-cycles in each full cycle of power on said power line to energize said amplifier circuit during said one half-cycle.

26. A control system having an input hysteresis transfer characteristic comprising: an amplifier circuit activated responsive to a particular voltage level of input; an input circuit for producing said voltage level input to said amplifier and responsive to a variable level external control signal; means in said input circuit responsive to the activation of said amplifier circuit for varying the level at which said input circuit is responsive to said external control signal to produce said voltage level input to said amplifier; and circuit means coupled to a power line and to said amplifier circuit and operative during the positive half-cycles of power on said power line to energize said amplifier circuit; and a memory circuit coupled to said amplifier for maintaining a record of the condition of said amplifier from one positive line cycle to the next.

27. A control system as claimed in claim 26 wherein said input circuit comprises a bridge circuit for receiving said external control signal, and wherein said means responsive to said amplifier activation comprises a circuit component in one arm of said bridge coupled to said amplifier.

28. A control system as claimed in claim 26 including a sawtooth generator for producing a sawtooth waveform, each sawtooth wave extending over a plurality of power line cycles, and circuit means in said input circuit responsive to said sawtooth wave for varying the voltage level at which said amplifier is activated.

* * * * *